United States Patent [19]

Chuan

[11] Patent Number: 5,666,611
[45] Date of Patent: Sep. 9, 1997

[54] IMAGE SCANNER WITH ONE LIGHTING UNIT AND ONE DRIVE SYSTEM FOR SCANNING EITHER REFLECTIVE OR TRANSPARENT OBJECTS

[76] Inventor: Tsia Shui Chuan, No. 3, Alley 80, Lane 108, Sec. 1, Kuang-fu Road, Hsin-Chu, Taipei, Taiwan

[21] Appl. No.: 606,024

[22] Filed: Sep. 29, 1995

[51] Int. Cl.[6] .................................................. G03G 15/04
[52] U.S. Cl. .............................................. 399/203; 399/378
[58] Field of Search .................................. 355/230, 233, 355/235; 358/487, 497; 399/203, 211, 378

[56] References Cited

U.S. PATENT DOCUMENTS

| | | | |
|---|---|---|---|
| 4,678,320 | 7/1987 | Fujii | 355/233 X |
| 4,893,196 | 1/1990 | Koshiyouji et al. | 358/474 |
| 5,140,443 | 8/1992 | Iwahara et al. | 358/474 |
| 5,392,100 | 2/1995 | Yoshida | 355/235 |
| 5,523,876 | 6/1996 | Tellam et al. | 358/494 |

*Primary Examiner*—Robert Beatty
*Attorney, Agent, or Firm*—Pro-Techtor International

[57] ABSTRACT

An image scanner with one lighting unit and one drive system for scanning both reflective and transparent objects includes a lighting unit, a reflect mirror unit, a lens and an image sensing unit. The planes for placing reflective objects and transparent objects are located on opposite sides of the lighting unit, and light of lighting unit reflecting from the surface of the reflective object or projecting directly through the transparent object to the image sensing unit by the reflect mirror unit and lens to match different modes of image scanning. The mirror unit may be driven to two different position by a lead screw drive mechanism.

5 Claims, 13 Drawing Sheets

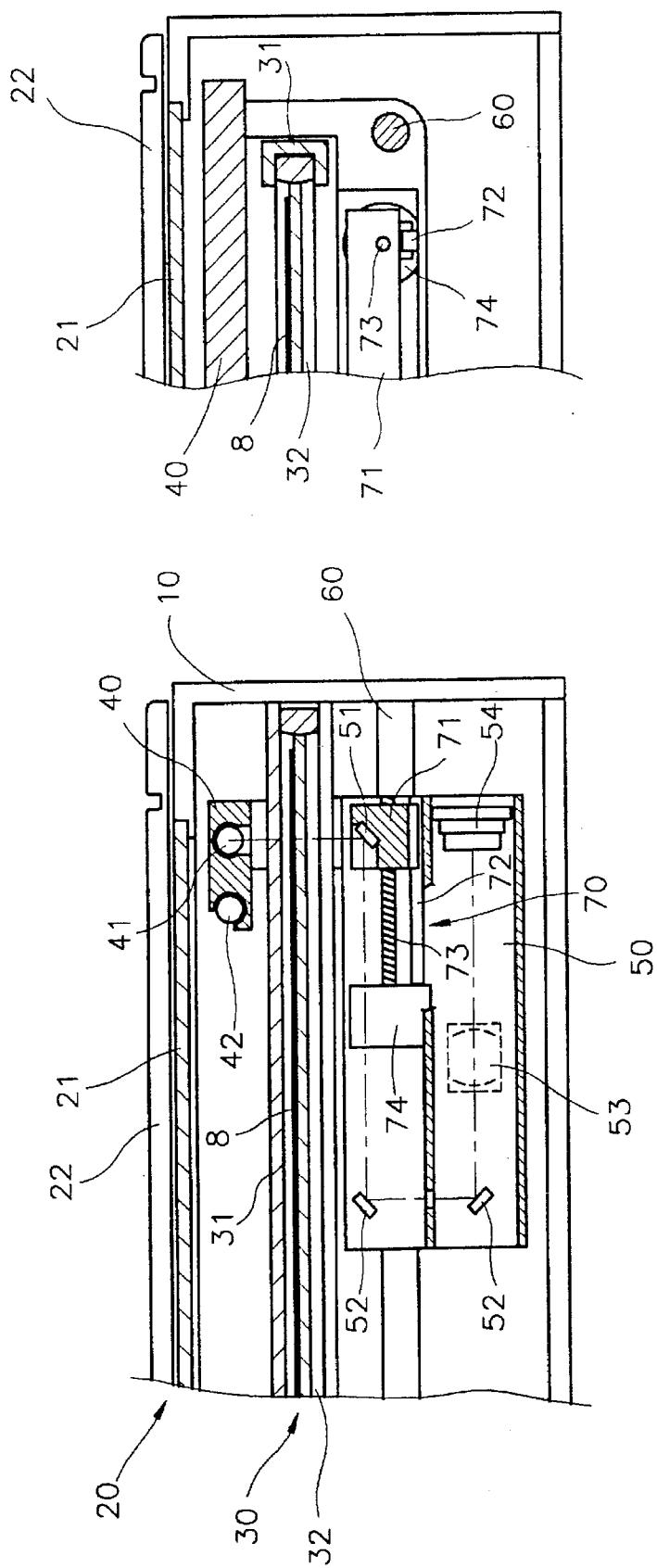

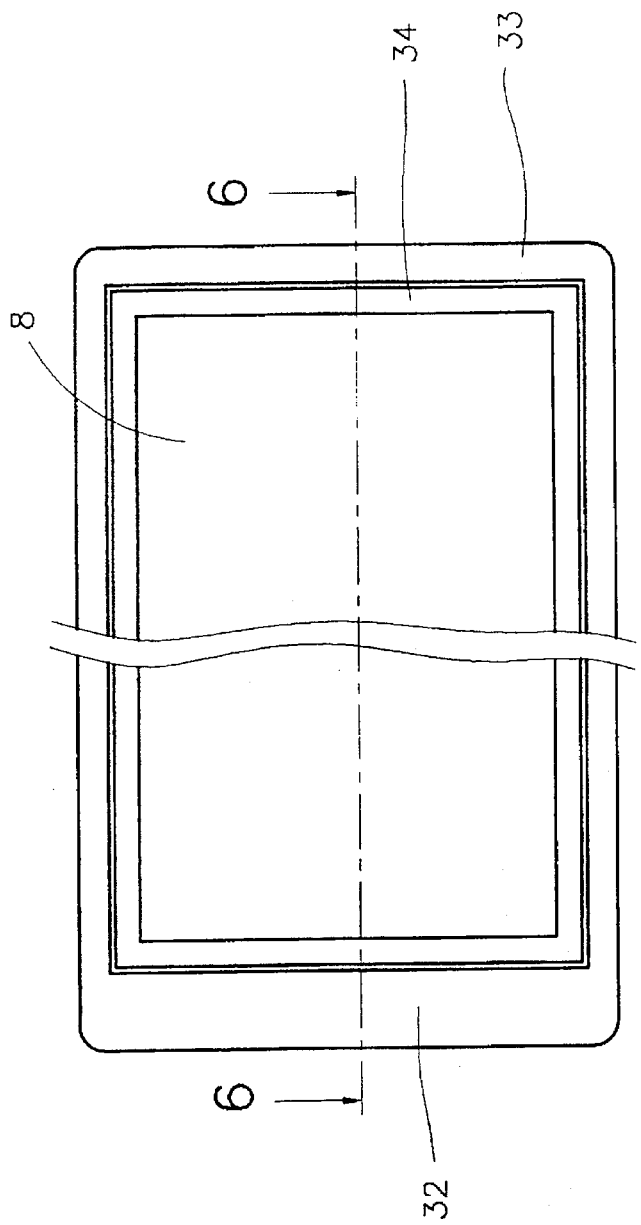
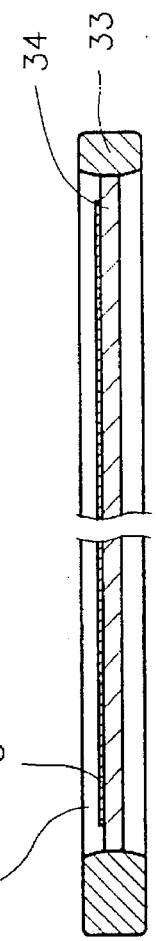
FIG 5
FIG 6

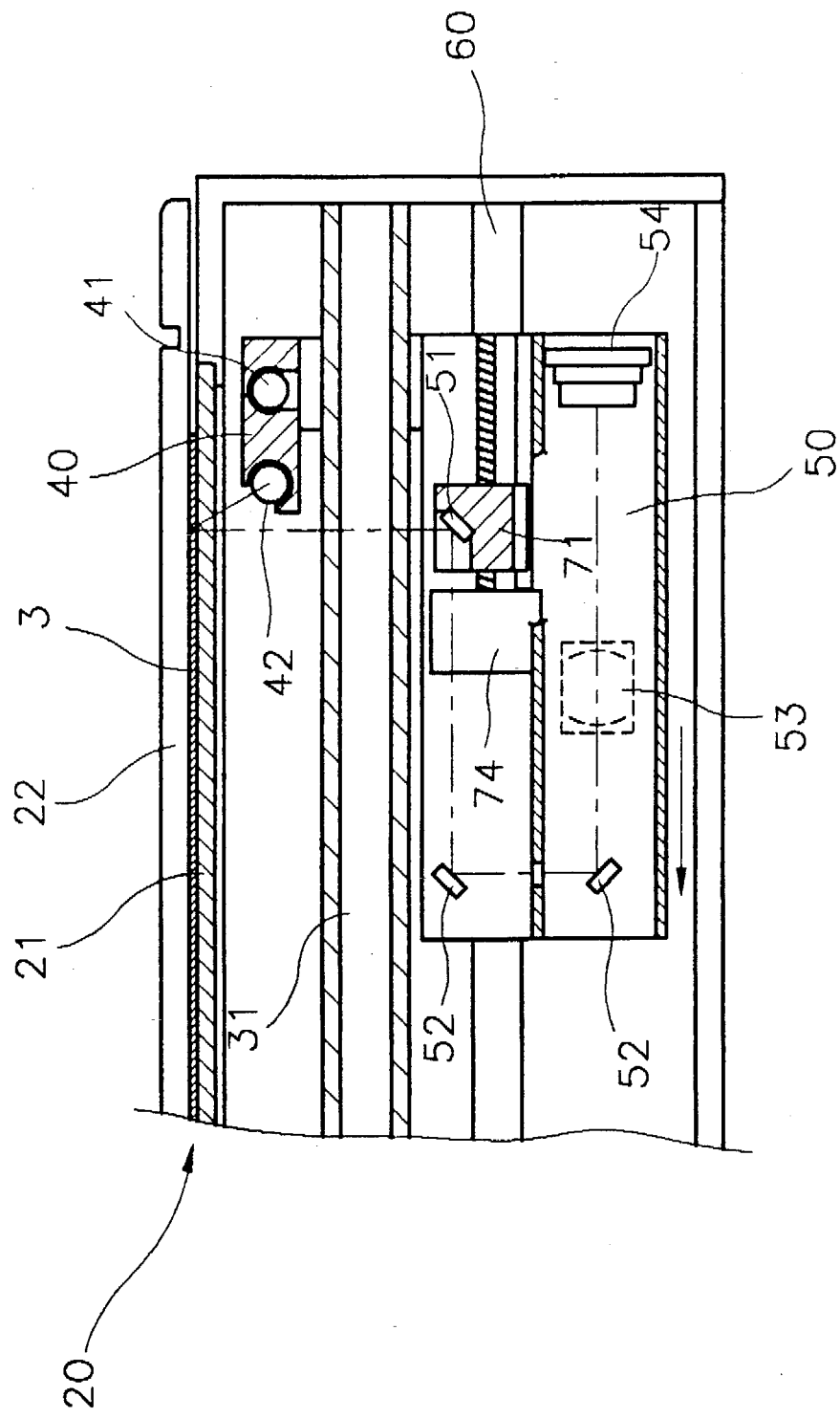

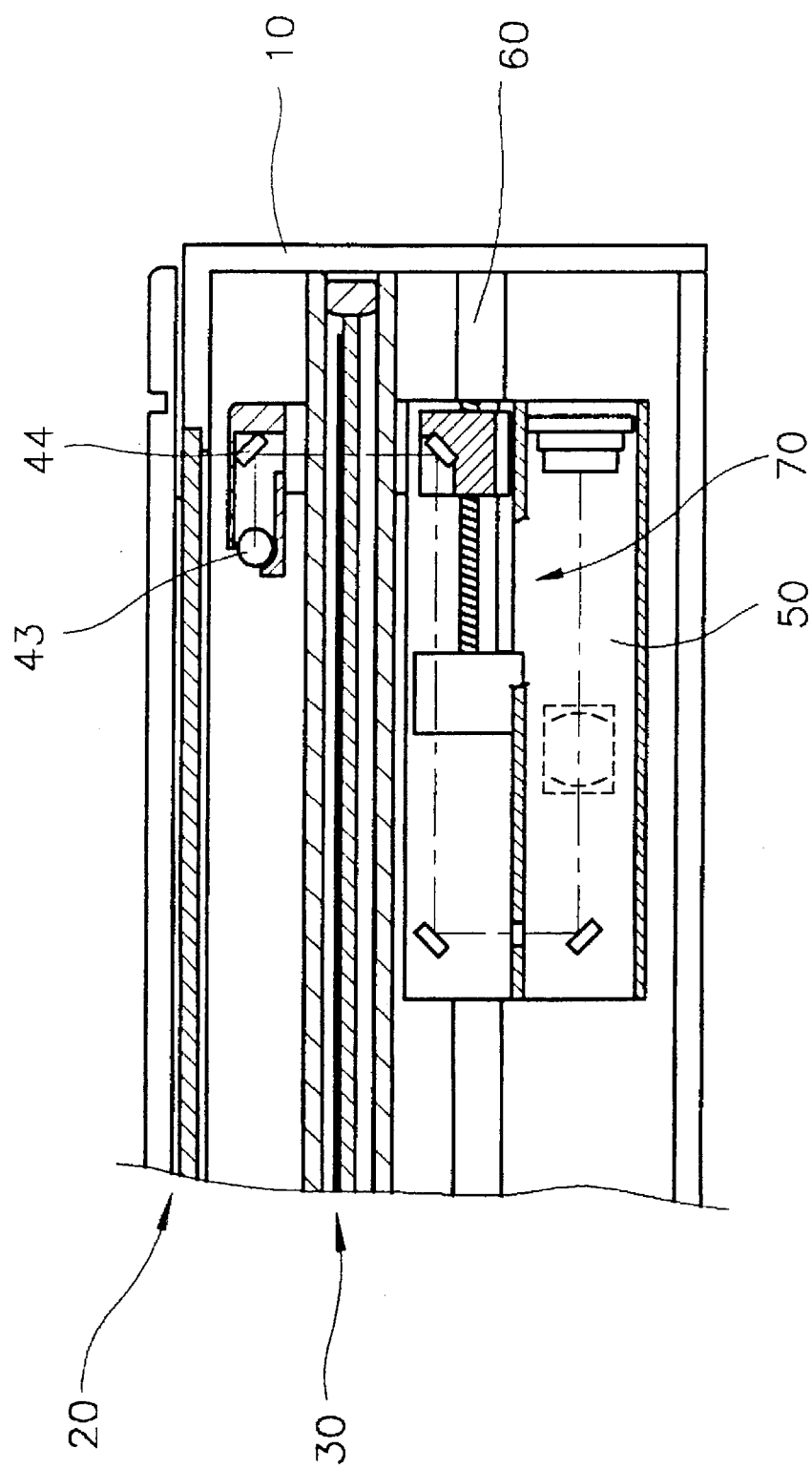

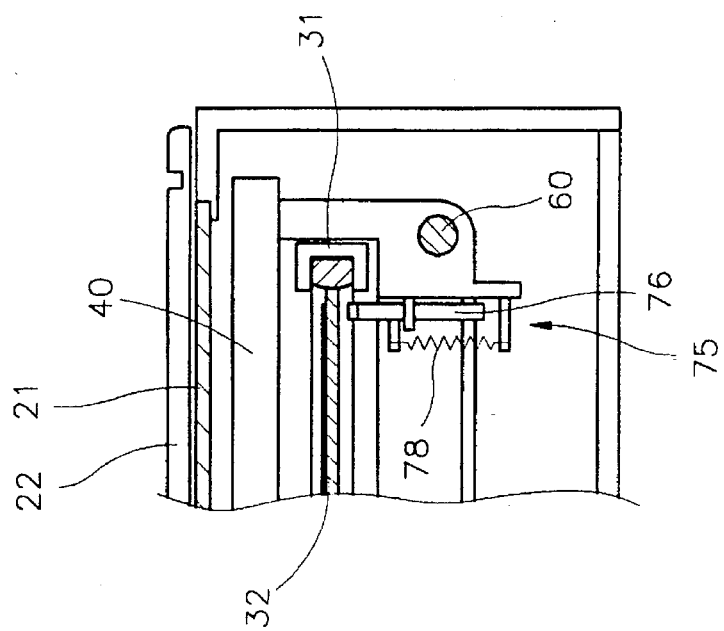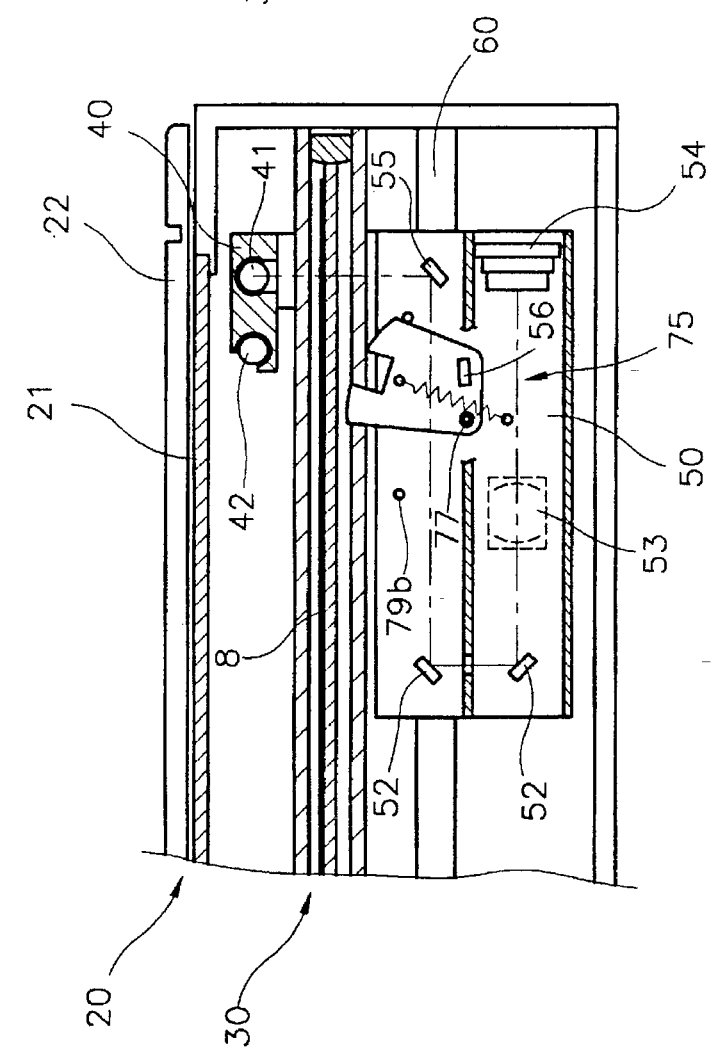

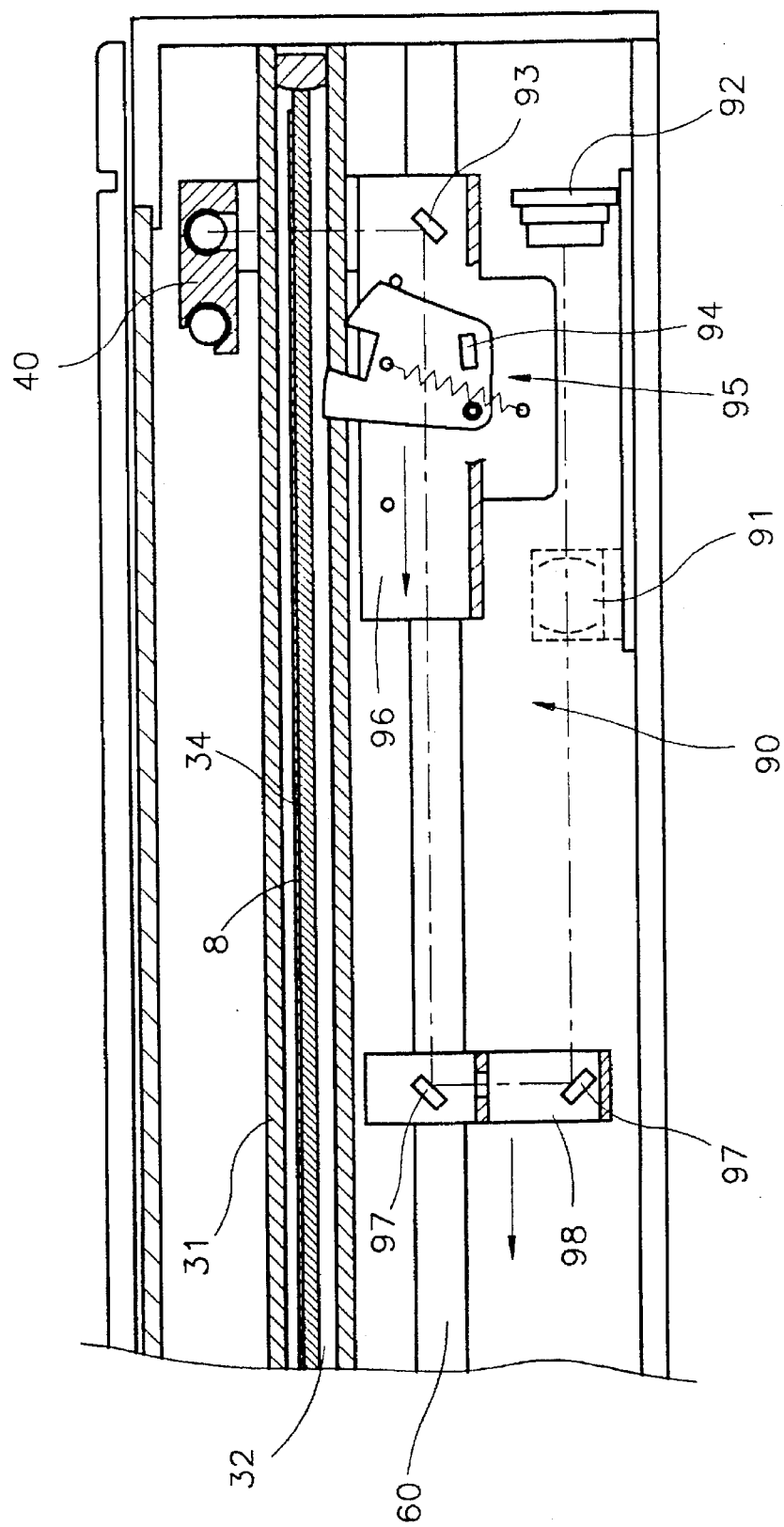

IMAGE SCANNER WITH ONE LIGHTING UNIT AND ONE DRIVE SYSTEM FOR SCANNING EITHER REFLECTIVE OR TRANSPARENT OBJECTS

BACKGROUND OF THE INVENTION

The present invention relates to an image scanner with one lighting unit and one drive system for scanning either reflective or transparent objects, and particularly to an image scanner that may scan either reflective or transparent objects by using the same lighting unit and drive system.

Generally speaking, there are two different modes for scanning reflective and transparent objects with the platform image scanner, and up to now different units have been used for the two different modes of scanning.

The majority of image scanners are mainly designed for scanning reflective objects. The action of said mode, referring to FIG. 1, is to use a clamping plate 1 and a glass plate 2 for holding the object 3 in position on the scanning plane of the scanner with the side of the object 3 to be scanned facing said glass plate 2. On the scanning side facing said object 3 there is a lighting unit 4a and a mirror unit 5; said lighting unit is provided for projecting light to image sensor 6 of said image scanner. Said lighting unit 4a, mirror unit 5 and image sensor are driven by a drive system(not shown) for linear reciprocal displacement along a guide rod 9 and therefore the entire image of the object 3 is scanned into said image sensor 6.

Referring to FIG. 2, when the image scanner is in the mode of scanning a transparent object, another glass plate 7 and said glass plate 2 are used to hold transparent object 8 (such as transparency, celluloid, etc.) in position on the scanning plane, and then lighting unit 4b, located above said transparent object 8, projects light through said transparent object 8. Said mirror unit 5 then reflects light from said transparent object 8 into said image sensor 6 as lighting unit 4b, mirror unit 5 and image sensor 6 simultaneously move down the entire length of transparent object 8.

The said conventional image scanner for scanning reflective and transparent objects, because the direction of the light is different for the two modes of scanning, must have two lighting units located in different positions, and two drive systems to drive image sensing unit for scanning in different modes. As a result the structure of said conventional image scanner is complicated and cost is increased. In addition, for scanning transparent objects, because lighting unit 4b, mirror unit 5 and image sensor 6 are driven by different drivers which must be synchronized, the controller is so complicated as to further increase its production cost.

In view of this, the inventor has devoted himself to thinking and research and finally developed the present invention through persistent testing and improvement based on experience in the production of related products over the years.

SUMMARY OF THE INVENTION

It is an objective of the present invention to provide an image scanner with one lighting unit and one drive system for scanning both reflective and transparent objects.

It is another objective of the present invention to provide a machine which may be installed quickly and easily.

It is another objective of the present invention to provide a machine which is relatively inexpensive to produce.

It is another objective of the present invention to provide a machine which is relatively simple to produce.

BRIEF DESCRIPTION OF THE DRAWING

FIG. 3 is a sectional view of the present invention, showing the structure of the first embodiment, and a schematic drawing illustrating the operation of scanning transparent objects.

FIG. 4 is a side sectional view of FIG. 3.

FIG. 5 is a flat view of the present invention, showing the structure of transparent object holder.

FIG. 6 is a sectional view along line A—A of FIG. 5.

FIG. 7 is a sectional view of the present invention, showing the operation of the first embodiment scanning a reflective object.

FIG. 8 is a sectional view of the present invention, showing another embodiment of lighting unit.

FIG. 9 is a sectional view of the present invention, showing the structure of the second embodiment of the change-over unit and its operation of scanning transparent objects.

FIG. 10 is a side sectional view of FIG. 9.

FIG. 17 is a sectional view of the present invention, showing another change of the embodiment of image sensing unit.

DETAILED DESCRIPTION OF THE INVENTION

Figure 1:
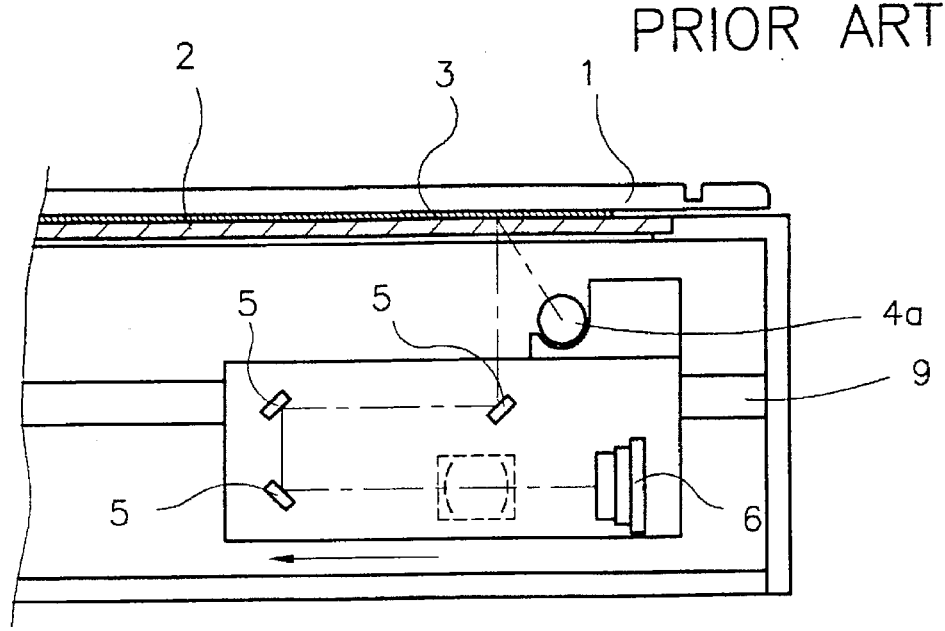
FIG. 1 is a schematic drawing showing the structure of the conventional image scanner for scanning reflective objects.
Figure 2:
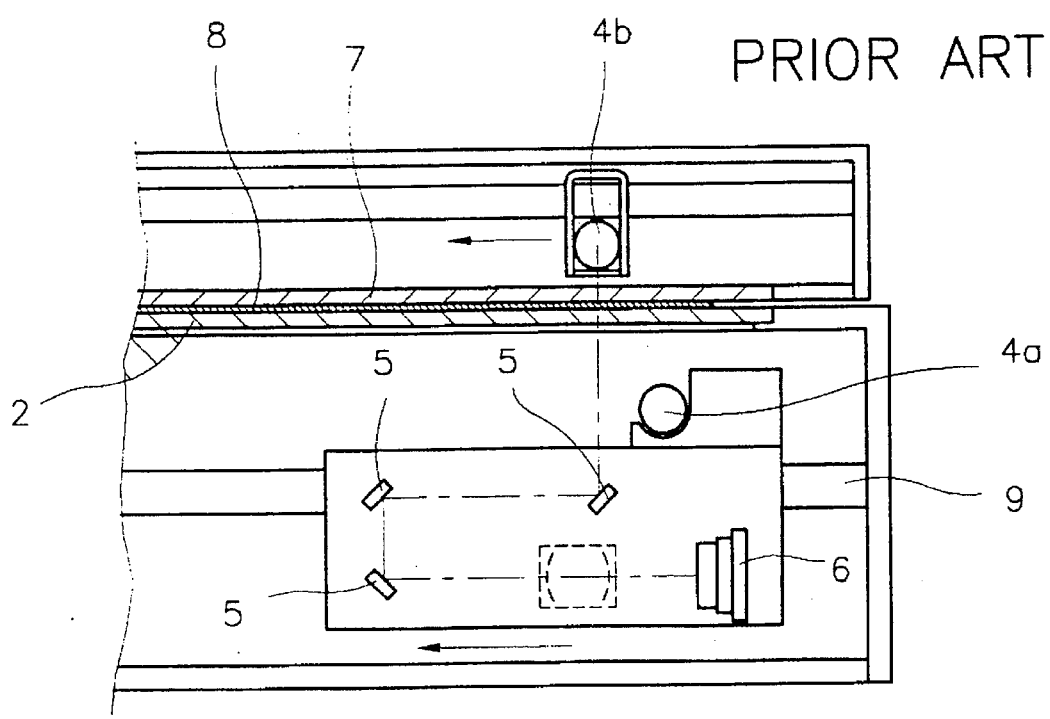
FIG. 2 is a schematic drawing showing the structure of the conventional image scanner for scanning transparent objects.

Referring to various drawings, the image scanner with one lighting unit and one drive system for scanning both reflective and transparent objects comprises: a housing 10, a reflective object support 20 mounted on the top of said housing 10, a transparent object holder support 30, a lighting unit 40 mounted between said reflective object support 20 and transparent object holder support 30, an image sensing unit 50, and a guide unit 60 for guiding said image sensing unit 50.

Referring to FIGS. 3 through 7, and more particularly to FIG. 7, said reflective object support 20 includes a glass plate 21 and a clamping plate 22. The side of said reflective object 3 to be scanned may be placed flat on said glass plate 21 and held by said clamping plate 22 and retained to the top of said housing 10.

Referring to FIGS. 3, 4, 5 and 6, said transparent object holder support 30 includes transparency holder guide 31 within said housing 10 and a transparency holder 32 inserted in said transparency holder guide 31; said transparency holder 32 consists of a frame 33 and a glass 34. Said transparent object 8 can be placed on said glass 34 for insertion in said transparency holder guide 31 and positioning on a plane parallel to the plane where said reflective object 3 would be placed on said reflective object support 20.

The light of said lighting unit 40 located between said reflective object support 20 and transparent object holder support 30 may be projected to the surface of said reflective object 3 and then transmitted to said image sensing unit, or alternatively may be projected downward to image sensing unit directly through said transparent object 8 to permit image of said reflective object 3 transparent object 8 to be scanned.

The image sensing unit 50 of the present invention includes a movable mirror 51, fixed mirrors 52, lens 53, image sensor 54 and a change-over unit 70 for adjusting the position of said movable mirror 51.

Said movable mirror 51 may be changed in position for said image scanner in different modes of scanning to alternatively reflect image of said reflective object 3 or transparent object 8 to said image sensor 54 by means of said fixed mirrors 52 and said lens 53 so as to change over scanning mode of image scanner.

Said image sensing unit 50 and said lighting unit 40 are connected together. When scanning, said image sensing unit 50 and lighting unit 40 are driven by a drive system (not shown ) moving along said guide unit 60 in order to scan said reflective object 3 or transparent object 8.

The first embodiment of the present invention is mainly characterized by the mirrors being totally the same for scanning either transparent objects or reflective objects. Said movable mirror 51 may be driven by said change-over unit 70 to the first position(FIG. 3) for transmitting light of lighting unit 40 to said fixed mirrors 52 directly through said transparent object 8, or to the second position (FIG. 7) for transmitting light of lighting unit 40 to said fixed mirrors 52 from the surface of said reflective object 3.

Referring to FIG. 3, change-over unit 70 in said first embodiment includes a carriage 71 for mounting said movable mirror 51, and a guide rail 72 for guiding said carriage 71 to move, and a lead screw 73 for driving said carriage 71 moving along said guide rail 72 while leading said movable mirror 51 to move to said first position and second position, and a motor 74 for driving said lead screw 73.

In order to obtain better quality of image, said lighting unit 40 may change the direction of light under different modes of scanning. Referring to FIG.3, said lighting unit 40 includes a first light tube 41 for downward lighting, which may be turned on to provide light necessary for scanning transparent object 8 and a second light tube 42 for upward lighting, which may be turned on to provide light necessary for scanning reflective object 3. Referring to FIG. 8, another change of the structure of said lighting unit 40, said lighting unit 40 includes a single light tube 43 and light of said light tube 43 may be projected upward to the surface of said reflective object 8, or downward through said transparent object 8 by means of a reflect element 44 (such as a mirror or reflective plate) so as to provide light necessary for two different modes of scanning with one light tube.

*notes:
1. The location of MIRROR in various embodiments is for illustration purpose only, it may be adjusted subject to the need of OPTICAL PATH.
2. Light tubes in double light-tube embodiments may be turned on simultaneously or respectively subject to actual need.

Referring to FIG. 3, when the first embodiment is provided for scanning a transparent object, said movable mirror 51 moves to said first position and said transparent object 8 is placed on said transparency holder 32 and inserted in said transparency holder guide 31, and light of lighting unit 40 is projected downward to said movable mirror 51 through said transparent object 8 and is transmitted to said image sensor 54 by means of fixed mirrors 52 and lens 53.

Referring to FIG.7, when the first embodiment is provided for scanning a reflective object, said reflective object 3 is placed on said reflective object support 20 and change-over unit 70 drive movable mirror 51 to the second position and light of lighting unit 40 is projected upward to the surface of said reflective object 3 and is transmitted to said image sensor 54 by means of said movable mirror 51, fixed mirrors 52 and lens 53.

Figure 11:
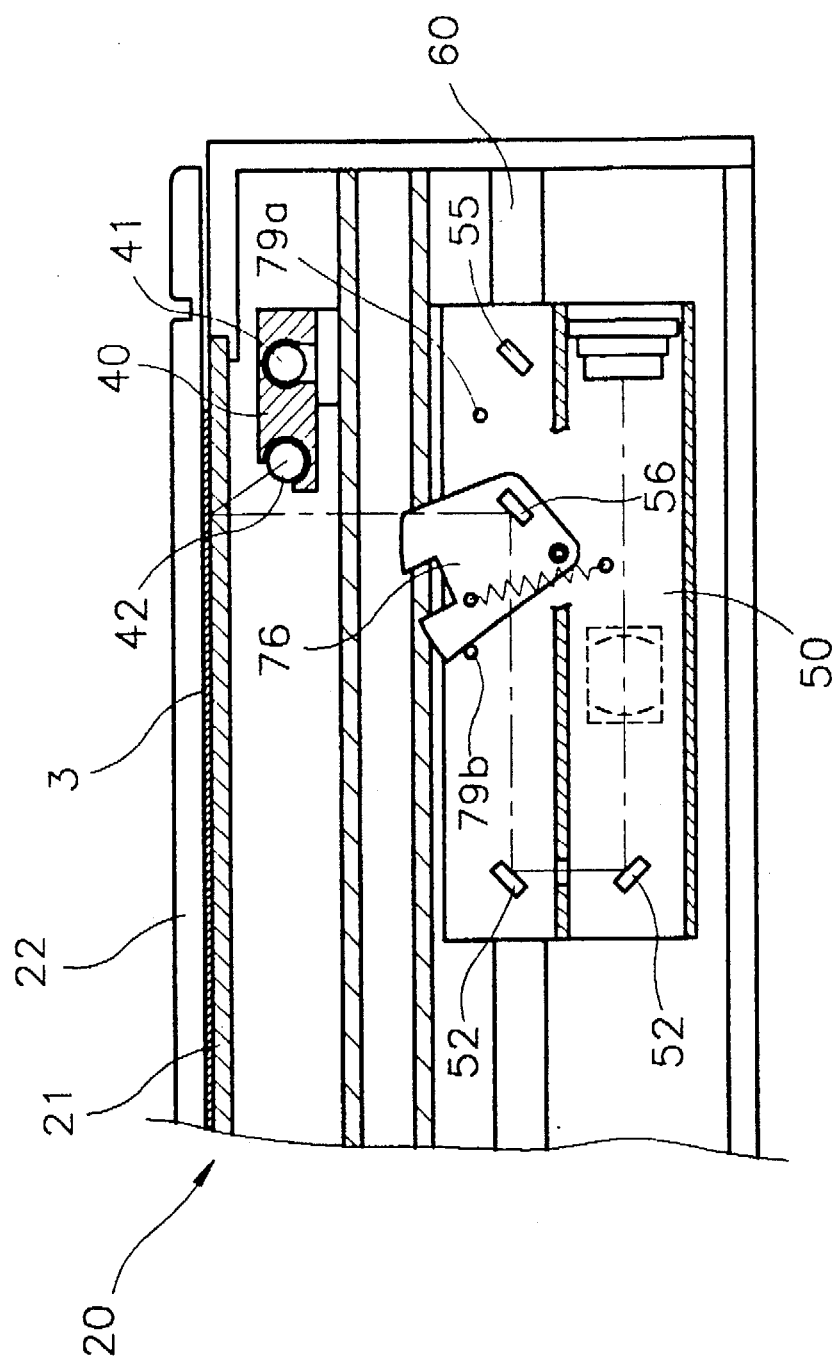
FIG. 11 is a sectional view of the present invention, showing the operation of the second embodiment of the change-over unit and its operation of scanning a reflective object.

Referring to FIGS. 9 through 11, the differences between said second embodiment and first embodiment lie in the structure of mirror and change-over unit. Said second embodiment includes a first mirror 55 and a second mirror 56 mounted on said change-over unit 75 with angle position changeable; said first mirror 55 may reflect light of lighting unit 40 from said transparent object 8 to said fixed mirrors 52, lens 53 and to the image sensor 54, and said second mirror 56 is provided to reflect light from the surface of said reflective object 3 to said fixed mirrors 52, lens 53 and to the image sensor 54 to enable image to be scanned.

Referring to FIGS. 9 and 11, in said second embodiment, said second mirror 56 is changed by said change-over unit 75 to first position(FIG. 9) to avoid obstructing said first mirror 55 reflecting light through said transparent object 8 to said fixed mirrors 52 and transmitting it to said image sensor 54 through lens; and changed to second position (FIG. 11) to enable it to reflect light from the surface of said reflective object 3 to said fixed mirrors 52 and to obstruct said first mirror from reflecting light.

Referring to FIG. 9 for scanning transparent objects, said second mirror 56 is changed to said first position while using said first mirror 55 for reflecting image of said transparent object 8. Referring to FIG. 11, for scanning a reflective object, said second mirror 56 is changed to said second position while using said second mirror 56 for reflecting image of said reflective object 3. Because light reflecting path of said first and second mirror 55, 56 overlap when said second mirror 56 is changed to said second position, it may obstruct reflected light from said first mirror 55 and enable reflected light of second mirror 56 to be transmitted to said image sensor 54.

Figure 12:
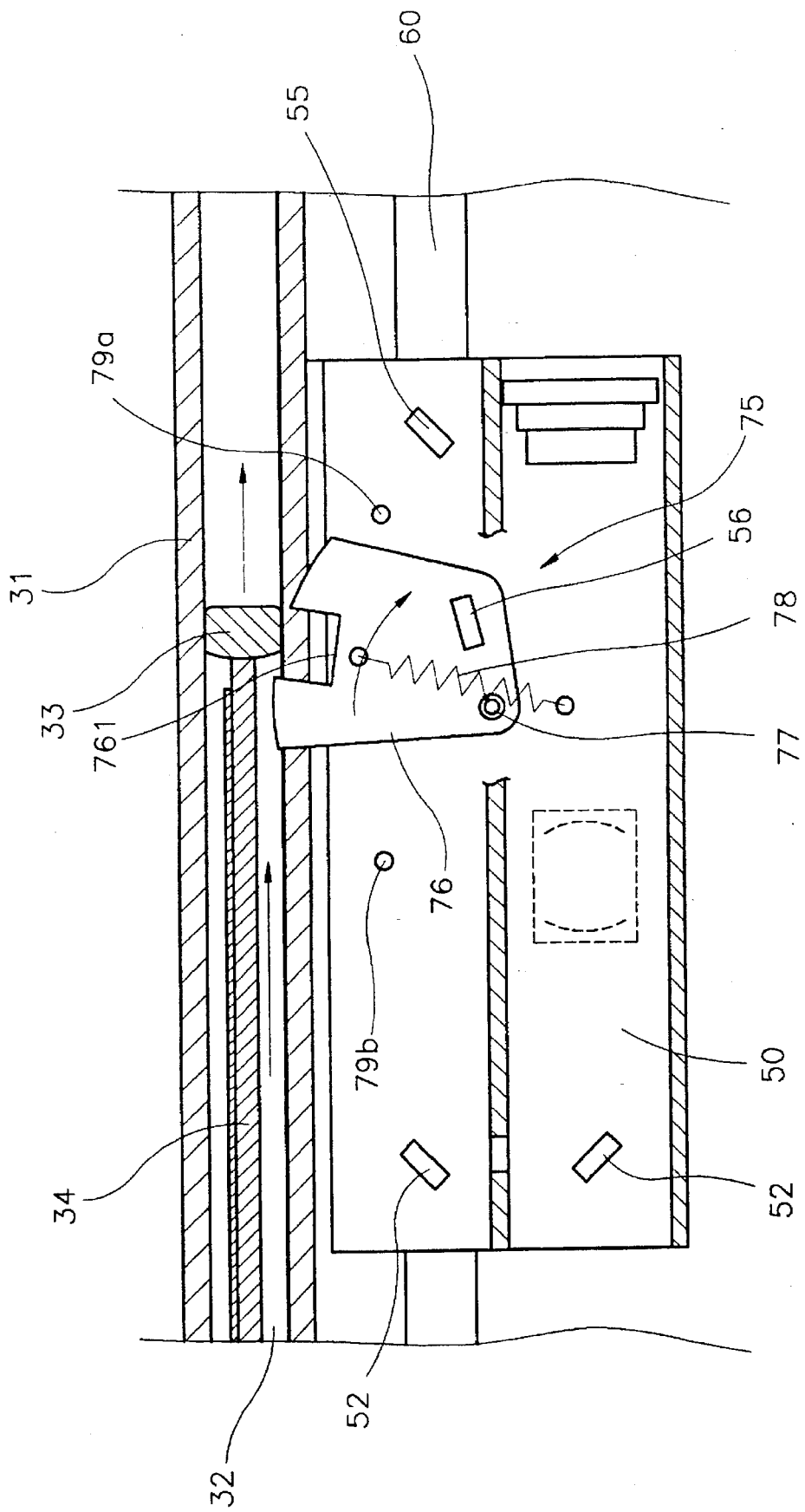
FIG. 12 through 14 are schematic drawings of the present invention, illustrating continuous operation of change-over unit of the second embodiment.
Figure 14:
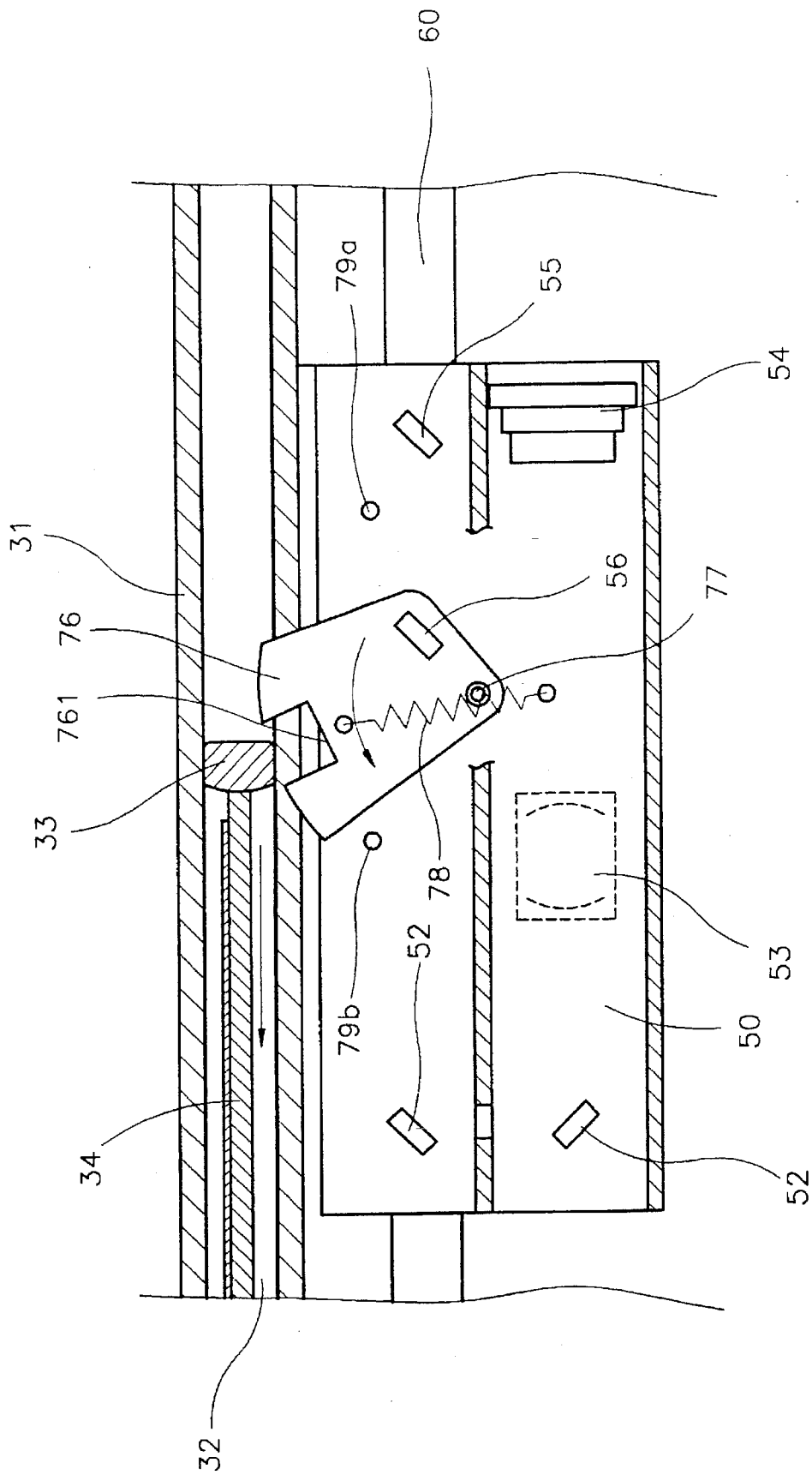

Referring to FIGS. 12 and 14, said change-over unit 75 includes a rotor 76 which is pivoted on said image sensing units 50 by means of center pin 77, and a spring 78 which is connected between said rotor 76 and said image sensing unit 50. A first stopper 79a and a second stopper 79b are provided for positioning said rotor 76.

Said rotor 76 leans on first stopper 79a or said second stopper 79b with the help of spring 78's tensile force. When said rotor 76 is leaning on said first stopper 79a, said second mirror 56 is located in said first position while when said rotor 76 is leaning on said second stopper 79b, said second mirror 56 is positioned in said second position.

Figure 13:
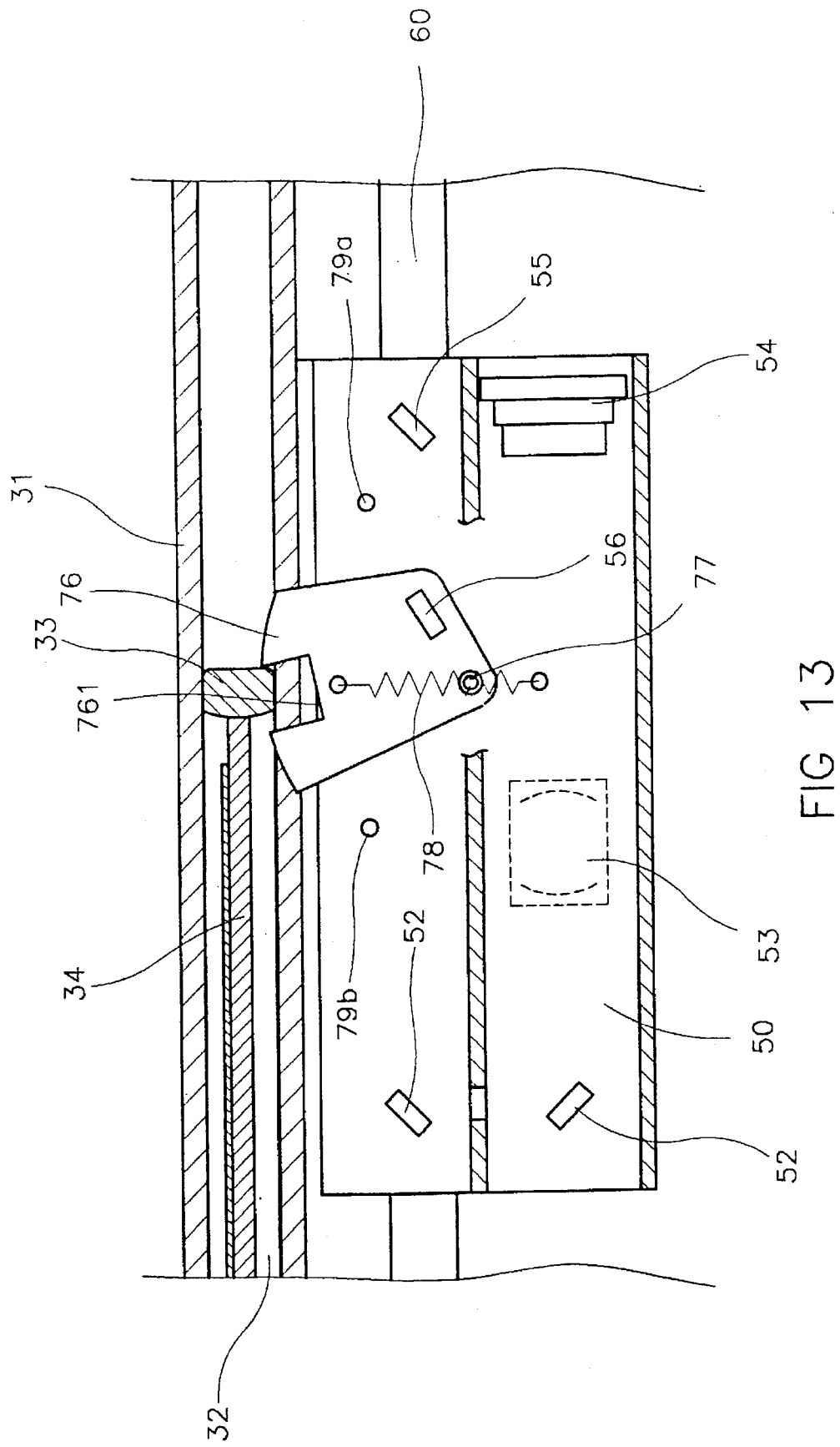

Referring to FIGS. 12 through 14, top end of said rotor 76 is protruding over said transparency holder guide 31. In the central position of the rotor's top end there is an open slot 761. Referring to FIG. 12, when said transparency holder 32 is inserted in said transparency holder guide 31, front end of side frame 33 of said transparency holder 32 pushes said rotor 76 toward said first stopper 79a. When said transparency holder 32 is extracted from said transparency object holder guide 31, the rear edge of the front end of side frame 33 of said holder 32 will slide into said open slot 761 and push said rotor 76 toward said second stopper 79b (FIG. 14).

Referring to FIG. 13, said rotor 76 when pushed will pass by a neutral position in which said spring 78 (connected to two ends of rotor 76 and image sensing unit 50) is in line with said center pin 77, and said rotor only needs to be inclined toward either direction for tensile force of said spring 78 to drive said rotor in rotation till it is stopped by either said first or second stopper 79a, 79b. Therefore when said rotor 76 is pushed by said transparency holder 32 to transcend the neutral position it will be dragged by said spring 78 toward said first or second stopper.

Referring to the structure shown, for scanning reflective objects because the second mirror 56 may obstruct transmission of light reflected by said first mirror 55, said second mirror 56 must be mounted on said change-over unit 75. On the other hand in another embodiment, when said first mirror 55 may obstruct said second mirror 56 from light transmission, said second embodiment must be changed by fixing said second mirror 56 while mounting said first mirror 55 on said change-over unit 75.

Figure 15:
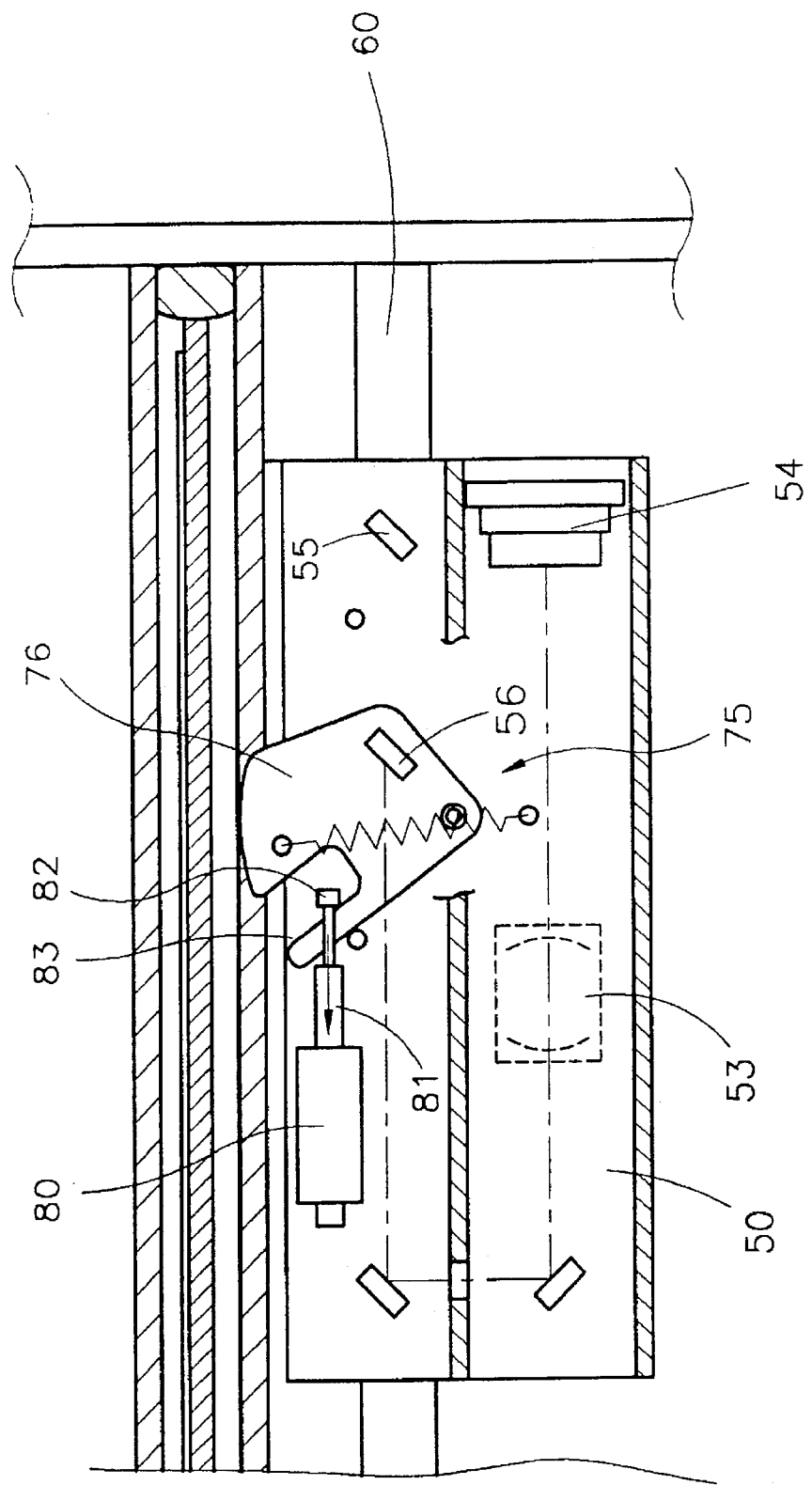
FIG. 15 and 16 are schematic drawings of the present invention, illustrating the structure and operation of change-over unit in another form of the second embodiment.
Figure 16:
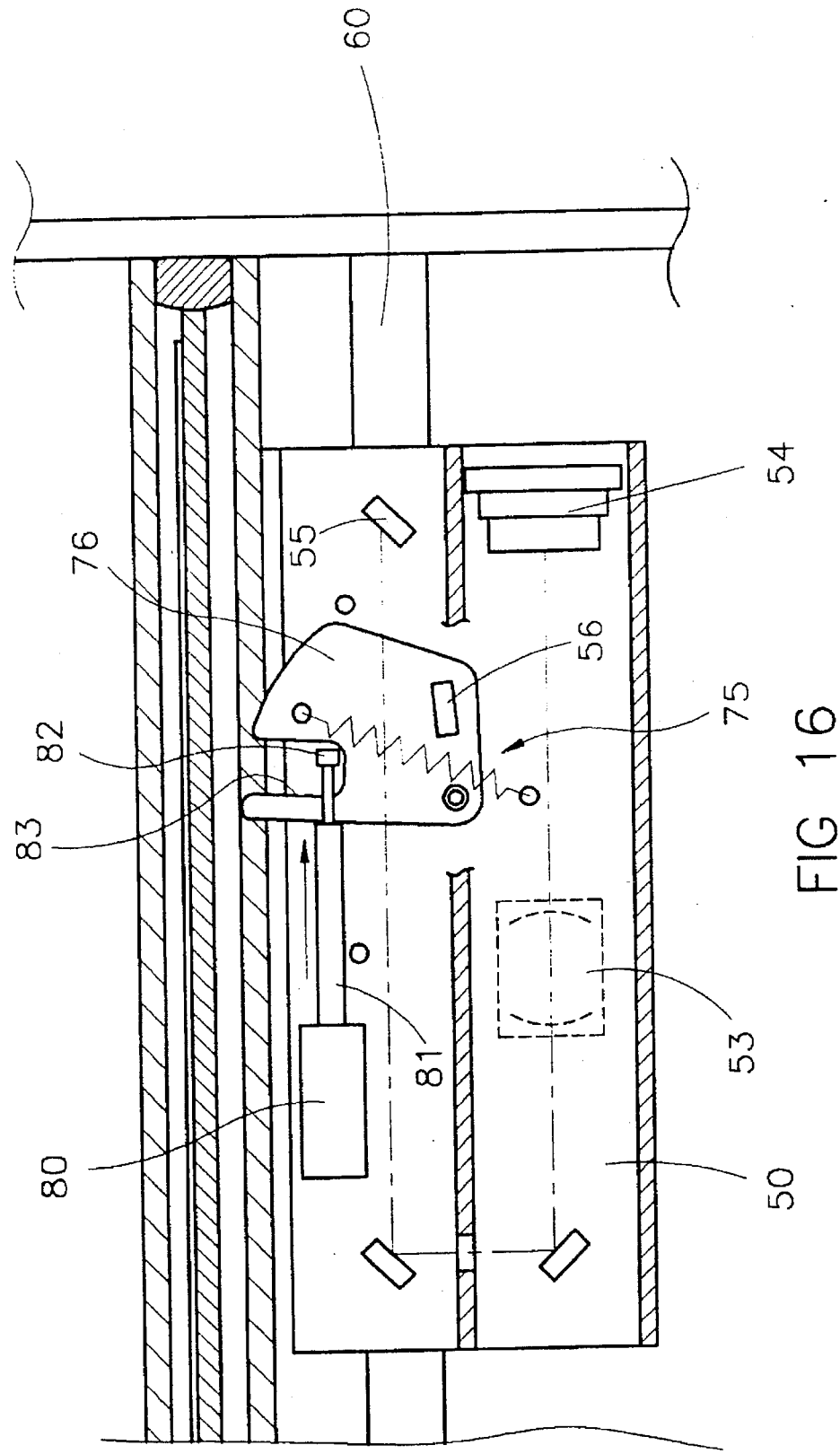

In addition, said change-over unit 75 may be driven by other means such as FIG. 15 and 16, where a solenoid controller 80 is provided to control a follower 81 in linear reciprocal movement. On front end of said follower 81 there is a coupler 82; said coupler 82 may be stuck in the open slot 83 of said rotor 76 whereby when said follower 81 is driven by solenoid controller 80, it may drive said rotor enabling said second mirror 56 to move to said first and second positions.

The structure of said image sensing unit 50 may further be changed as the embodiment in FIG. 17. The image sensing unit 90 in FIG. 17 includes a lens 91 and image sensor 92 fixedly mounted in said housing 10, and mirrors 93, 94, lighting unit 40 and change-over unit 95 fixed on a first moving unit 96 while reflect mirrors 97 is located on a second moving unit 98. Said first and second moving units 96,98 may be driven for linear and reciprocal movement along said guiding unit 60 while leading said lighting unit and reflect mirror to move for scanning said reflective object 3 or transparent object 8.

With the above-described conjunction of said lighting unit, mirror and change-over unit, the present invention may use one lighting unit and image sensing unit for scanning images of both reflective objects and transparent objects so as to minimize the size of the structure and the cost of the scanner. Whether used for scanning transparent objects or reflective objects, said lighting unit and image sensing unit may be driven by one drive system. Therefore both can be engaged in synchronous operation, avoiding the defects of nonsynchronous operation of reflect mirror and lighting unit of the conventional image scanner for scanning transparent objects. As a result it may further reduce the numbers of parts and the dimensions of the unit, and simplify the structure of controller for it has no need to control the synchronous aspects of the scanner's operation.

Therefore, there has been shown and described a novel image scanner which fulfills all the objectives and advantages sought therefrom. Many changes, modifications, variations and other uses and applications of the subject invention will, however become apparent to those skilled in the art after considering the foregoing specifications together with the accompanying drawings. All such changes, modifications, variations and other uses and applications which do not depart from the spirit and scope of the invention are deemed to be covered by the invention which is limited only by the claims which follow.

What is claimed is:

1. An image scanner with one lighting unit and one drive system for scanning both reflective objects and transparent objects comprising:

an image sensing unit to scan an image of said reflective object and an image of said transparent object, a reflective object support to hold said reflective object to permit said image sensing unit to scan said image thereof, a transparent object holder support to hold said transparent object to permit said image sensing unit to scan said image thereof, said lighting unit is located between said reflective object support and said transparent object holder support and provides said image sensing unit light necessary to scan reflective objects and transparent objects, a change-over unit to drive a mirror to reflect said scanned images, said change-over unit comprises a carriage to mount a mirror and a driver to move said mirror back and forth between a first reflecting position and a second reflecting position, said driver includes a lead screw for driving said carriage, and a motor for driving said lead screw, said change-over unit drives said mirror to said first reflecting position during scanning of reflective objects and to said second reflecting position during scanning of transparent objects; and wherein to scan said reflective object, light from said lighting unit is projected to a surface of said reflective object, and to scan a transparent object, light of said lighting unit is transmitted to said image sensing unit directly through said transparent object.

2. An image scanner with one lighting unit and one drive system for scanning both reflective objects and transparent objects comprising:

an image sensing unit to scan an image of said reflective object and an image of said transparent object, a reflective object support to hold said reflective object to permit said image sensing unit to scan said image thereof, a transparent object holder support to hold said transparent object to permit said image sensing unit to scan said image thereof, a lighting unit located between said reflective object support and said transparent object holder support that provides said image sensing unit light necessary to scan reflective objects and transparent objects, and two mirrors, one of said mirrors is used in scanning said reflective objects and a second one of said mirrors is used in scanning said transparent objects, a first of said mirrors is fixedly mounted in position to transmit scanned objects to said image sensor, and a second of said mirrors is mounted on a change-over unit and driven by said change-over unit to a first position where said second mirror will not obstruct said first mirror from reflecting and transmitting images of said reflective objects and transparent objects to said image sensor, and to a second position where said second mirror will transmit said image of said object to said image sensor while obstructing the path of light from said first mirror; and wherein to scan said reflective object, light from said lighting unit is projected to a surface of said reflective object, and to scan a transparent object, light of said lighting unit is transmitted to said image sensing unit directly through said transparent object.

3. The image scanner with one lighting unit and one drive system for scanning both reflective objects and transparent objects as claimed in claim 2 wherein:

said change-over unit includes a rotor for driving said second mirror to said first and said second positions.

4. The image scanner with one lighting unit and one drive system for scanning both reflective objects and transparent objects as claimed in claim 3 wherein:

said change-over unit further includes a first location stopper to locate said second mirror on said rotor to said first position, and a second location stopper to locate said second mirror on said rotor to said second position.

5. The image scanner with one lighting unit and one drive system for scanning both reflective objects and transparent objects as claimed in claim 3 wherein:

said change-over unit further includes a driver to drive said rotor.

* * * * *